(12) United States Patent
Hine

(10) Patent No.: US 9,303,629 B2
(45) Date of Patent: Apr. 5, 2016

(54) SYSTEM AND METHOD FOR POWER GENERATION USING A HYBRID GEOTHERMAL POWER PLANT INCLUDING A NUCLEAR PLANT

(71) Applicant: Garry Hine, Burleigh Heads (AU)

(72) Inventor: Garry Hine, Burleigh Heads (AU)

(*) Notice: Subject to any disclaimer, the term of this patent is extended or adjusted under 35 U.S.C. 154(b) by 492 days.

(21) Appl. No.: 14/145,652

(22) Filed: Dec. 31, 2013

(65) Prior Publication Data

US 2014/0174081 A1    Jun. 26, 2014

Related U.S. Application Data

(63) Continuation of application No. PCT/AU2012/000850, filed on Jul. 13, 2012.

(30) Foreign Application Priority Data

Jul. 15, 2011    (AU) ................ 2011902916

(51) Int. Cl.
| | | |
|---|---|---|
| F03G 7/00 | (2006.01) |
| G21D 5/00 | (2006.01) |
| F03G 7/04 | (2006.01) |
| G21D 1/00 | (2006.01) |
| G21D 9/00 | (2006.01) |
| F22B 1/02 | (2006.01) |
| F24J 3/08 | (2006.01) |

(Continued)

(52) U.S. Cl.
CPC . *F03G 7/04* (2013.01); *F22B 1/023* (2013.01); *F24J 3/081* (2013.01); *G21D 1/00* (2013.01); *G21D 7/00* (2013.01); *G21D 9/00* (2013.01); *F28D 2021/0054* (2013.01); *Y02E 10/12* (2013.01); *Y02E 30/40* (2013.01)

(58) Field of Classification Search
CPC .............. F03G 7/04; G21D 7/00; G21D 1/00; G21D 9/00; F24J 3/081; F22B 1/023; Y02E 10/12; Y02E 30/40; F28D 2021/0054
USPC ................... 60/641.2–641.5, 644.1
See application file for complete search history.

(56) References Cited

U.S. PATENT DOCUMENTS

| | | | |
|---|---|---|---|
| 3,765,477 A | 10/1973 | Van Huisen | |
| 4,431,349 A * | 2/1984 | Coursen | ......... 405/303 |

(Continued)

FOREIGN PATENT DOCUMENTS

GB    856904 A    12/1960

OTHER PUBLICATIONS

International Preliminary Report on Patentability mailed Jun. 11, 2013 in PCT/AU2012/000850, 5 pages.

*Primary Examiner* — Hoang Nguyen
(74) *Attorney, Agent, or Firm* — Kilpatrick Townsend & Stockton LLP

(57) ABSTRACT

A hybrid geothermal power system is discussed. The system includes a geothermal system including power plant (101) and pumping station (102) and a nuclear plant (103). Pumping station (102) is used to inject fluid from reservoir (104) through an injection well (105) into the bedrock (106) (also referred to as the hot dry rock HDR zone) and extracted via a secondary bore (extraction well) usually coupled to the power plant (101). In the present example however the injection well is linked to the extraction well (107). As fluid is injected into the bedrock a drop in temperature occurs due to heat transfer to the fluid. Nuclear plant (103) is utilized to combat this drop, the plant (103) has the fissionable components (1091, 1092, 1093) of the reactor positioned within bores (1081, 1082, 1083) within the HDR zone.

20 Claims, 2 Drawing Sheets

Figure 1:
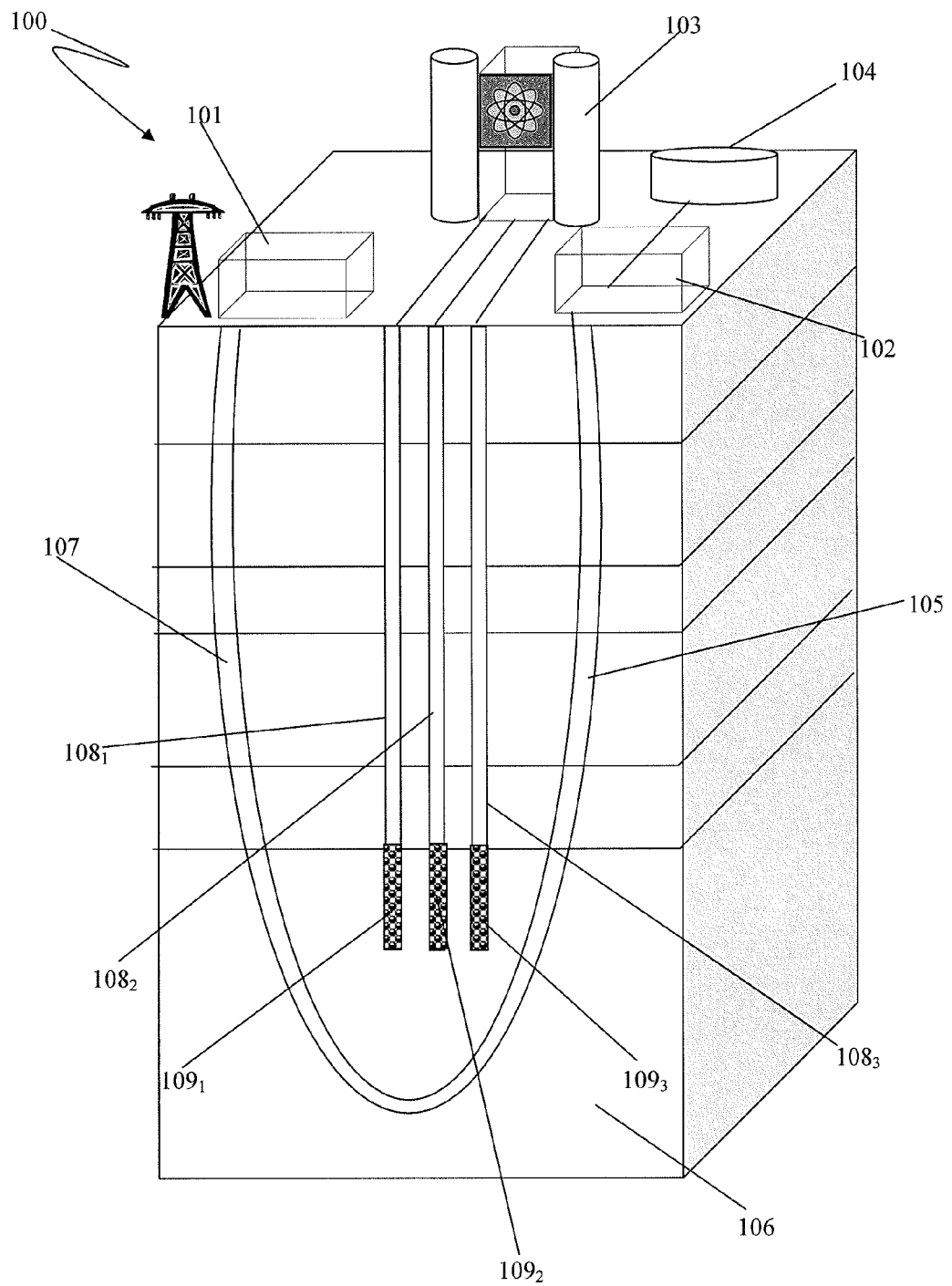

(51) Int. Cl.
    *G21D 7/00*     (2006.01)
    *F28D 21/00*     (2006.01)

(56) References Cited

U.S. PATENT DOCUMENTS

| | | | |
|---|---|---|---|
| 4,765,406 A * | 8/1988 | Frohling et al. | 166/247 |
| 4,851,183 A | 7/1989 | Hampel | |
| 5,911,684 A * | 6/1999 | Shnell | 60/641.2 |
| 6,301,894 B1 | 10/2001 | Halff | |
| 7,730,945 B2 | 6/2010 | Pieterson | |
| 8,640,462 B2 * | 2/2014 | Shnell | 60/641.2 |
| 2006/0137349 A1 | 6/2006 | Pflanz | |
| 2007/0181301 A1* | 8/2007 | O'Brien | 166/247 |
| 2007/0223999 A1* | 9/2007 | Curlett | 405/55 |

* cited by examiner

SYSTEM AND METHOD FOR POWER GENERATION USING A HYBRID GEOTHERMAL POWER PLANT INCLUDING A NUCLEAR PLANT

CROSS REFERENCE TO RELATED APPLICATIONS

This application is a Continuation of International Application No. PCT/AU2012/000850, International Filing Date Jul. 13, 2012, and which claims the benefit of AU patent application No. 2011902916, filed Jul. 15, 2011, the disclosures of both applications being incorporated herein by reference.

BACKGROUND OF THE INVENTION

1. Field of the Invention

The present invention relates in general to power generation. In particular although not exclusively the present invention relates to systems and methods for the production of power utilising geothermal energy.

2. Discussion of the Background Art

Given the increased awareness of the need for controlling emissions of $CO_2$ has seen considerable investment in clean/green technology. One of the largest sources of $CO_2$ emissions comes from the generation of power and more from coal powered stations. There are presently are number of power generation technologies which have a significantly lower carbon footprint to that of fossil fuel powered stations.

One such alternative is nuclear power, nuclear power provides about 6% of the world's energy and 13-14% of the world's electricity, with the U.S., France, and Japan together accounting for about 50% of nuclear generated electricity. While nuclear power is a sustainable energy source that reduces carbon emissions, it is exceedingly controversial. As recent examples in Japan and those of Chernobyl and Three Mile Island have shown the threat of meltdown is an ever present concern.

Another concern with nuclear power plants is the production of nuclear waste. A typical 1000-MWe nuclear reactor produces approximately 20 cubic meters (about 27 tonnes) of spent nuclear fuel each year (but only 3 cubic meters of vitrified volume if reprocessed). Spent nuclear fuel is initially very highly radioactive and so must be handled with great care and forethought.

However, it will decrease with time. After 40 years, the radiation flux is 99.9% lower than it was the moment the spent fuel was removed from operation. Still, this 0.1% is dangerously radioactive. After 10,000 years of radioactive decay, according to United States Environmental Protection Agency standards, the spent nuclear fuel will no longer pose a threat to public health and safety.

When first extracted, spent fuel rods are stored in shielded basins of water (spent fuel pools), usually located on-site. The water provides both cooling for the still-decaying fission products, and shielding from the continuing radioactivity. After a period of time (generally five years for US plants), the now cooler, less radioactive fuel is typically moved to a dry-storage facility or dry cask storage, where the fuel is stored in steel and concrete containers.

In addition to the problems of meltdown and waste there are also security concerns. Nuclear reactors and waste dumps are prime targets for terrorist, cause a meltdown and you can take out a large populated area and spread radioactive materials across a wider radius. The waste itself is also a target as it can be used in the manufacture of dirty bombs etc.

An alternate approach to nuclear power is that of geothermal power generation. Electricity generation from geothermal power requires high temperature resources that can only come from deep underground. The heat must be carried to the surface by fluid circulation. This circulation sometimes exists naturally where the crust is thin: magma conduits bring heat close to the surface, and hot springs bring the heat to the surface. Until recently most geothermal electric plants have been built exclusively where high temperature geothermal resources are available near the surface. The development of binary cycle power plants and improvements in drilling and extraction technology may enable enhanced geothermal systems over a much greater geographical range.

Enhanced Geothermal Systems (EGS) are a new type of geothermal power technologies that do not require natural convective hydrothermal resources. Until recently, geothermal power systems have only exploited resources where naturally occurring heat, water and rock permeability is sufficient to allow energy extraction from production wells. However, the vast majority of geothermal energy within reach of conventional techniques is in dry and non-permeable rock. EGS technologies "enhance" and/or create geothermal resources in this hot dry rock (HDR) through hydraulic stimulation.

When natural cracks and pores will not allow for economic flow rates, the permeability can be enhanced by pumping high pressure cold water down an injection well into the rock. The injection increases the fluid pressure in the naturally fractured rock which mobilizes shear events, enhancing the permeability of the fracture system. This process, termed hydro-shearing [3], used in EGS is substantially different from hydraulic tensile fracturing used in the oil & gas industries.

Water travels through fractures in the rock, capturing the heat of the rock until it is forced out of a second borehole as very hot water, which is converted into electricity using either a steam turbine or a binary power plant system. All of the water, now cooled, is injected back into the ground to heat up again in a closed loop. EGS/HDR technologies, like hydrothermal geothermal, are expected to be baseload resources which produce power 24 hours a day like a fossil plant. Distinct from hydrothermal, HDR/EGS may be feasible anywhere in the world, depending on the economic limits of drill depth.

In either case the thermal efficiency of geothermal electric plants is low, around 10-23% because geothermal fluids are at a low temperature compared with steam from boilers. By the laws of thermodynamics this low temperature limits the efficiency of heat engines in extracting useful energy during the generation of electricity. HDR wells are expected to have a useful life of 20 to 30 years before the outflow temperature drops about 10° C. and the well becomes uneconomic. If left for 50 to 300 years the temperature will recover. This limited life span and the expenses of drilling etc. makes the use of such power stations economically undesirable limiting their application.

Clearly it would be advantageous to provide a system and method for power generation which has a relatively low carbon footprint and which ameliorates some problems associated with the aforementioned prior art.

SUMMARY OF THE INVENTION

Disclosure of the Invention

Accordingly in one aspect of the present invention there is provided a system for power generation the system including:

a geothermal system including at least one injection shaft and at least one extraction shaft and wherein the extraction shaft is connected to the injection shaft;

a nuclear system including at least one reactor the reactor being positioned remote from the nuclear plant; and wherein the injection and extraction shafts extend a predetermined depth and the at least one reactor is positioned within the area defined between the injection and extraction shaft's base.

In yet another aspect of the present invention there is provided a method for producing power said method including the steps of:

drilling an injection shaft to a predetermined depth;

drilling an extraction shaft to a predetermined depth such that the extraction shaft is connected to the injection shaft;

positioning a reactor core in the area defined between the injection and extraction shaft's base;

pumping fluid into the injection shaft under low pressure;

extracting vapour under high pressure from the extraction shaft; and maintaining utilising the reactor core a substantially constant temperature differential within the area between the injection and extraction shafts to promote the conversion of the fluid to a high pressure vapour stream.

Suitably the geothermal system includes a power plant and a pumping station. Preferably the injection shaft and extraction shaft are drilled to a depth between 4400 m and 5000 m. The injection shaft and extraction shaft may be connected such that they form a substantially U shaped conduit between the power station and a pumping station.

Suitably the fluid is pumped into the top of the injection well at a relatively low pressure. The fluid may be feed in at a head pressure of between approx 30-40 psi. The pressure on the fluid at the base of the conduit may be between 5000 to 6000 psi and may be at a temperature between 450° C. to 500° C. The pressure on the fluid along the length of the extraction well may vary in pressure between 6000 to 3000 psi and may vary in temperature between 500° C. to 200° C. Preferably the fluid is ejected from the extraction well as high pressure vapour stream. The high pressure vapour stream is ejected from the extraction well at a pressure between 2500 psi-3300 psi. Suitably the high pressure vapour stream is unitised to drive one or more turbines housed within the power plant. The power plant may also contain one or more condensers for condensing the vapour stream back into a fluid for re-injection back into the injection well.

The geothermal system may include additional injection and extraction shafts positioned between the power plant and pumping station to increase the generation capacity of the plant. Any suitably fluid having an appropriate vaporisation temperature may be utilised in the system. Preferably the through the shafts is water.

Suitably the nuclear reactor is positioned in the region defined between the injection and extraction shaft/s. Preferably the reactor is positioned within a shaft at a depth of 3000 m to 4400 m. The reactor may be operated such that the heat generated by the fissionable component is utilised to heat the surrounding area. Preferably the fissionable material is in the form of a set of uranium rods as used in most standard nuclear reactors.

Suitably the shaft housing the reactor may include a series of explosive charges placed at discrete points along its length. Preferably the explosive charges are positioned such that when triggered they seal the shaft. The system may also include additional fail safe procedures such as filing the shaft with a shielding a material to a predetermined depth.

The nuclear system may include a plurality of reactors positioned with the region between the injection and extraction shaft/s. The nuclear system may also be utilised to generate power directly from the reactor/s. In such instances a number of auxiliary shafts could be provided to heat water to steam utilising the reactors in a conventional manner.

BRIEF DETAILS OF THE DRAWINGS

Figure 2:
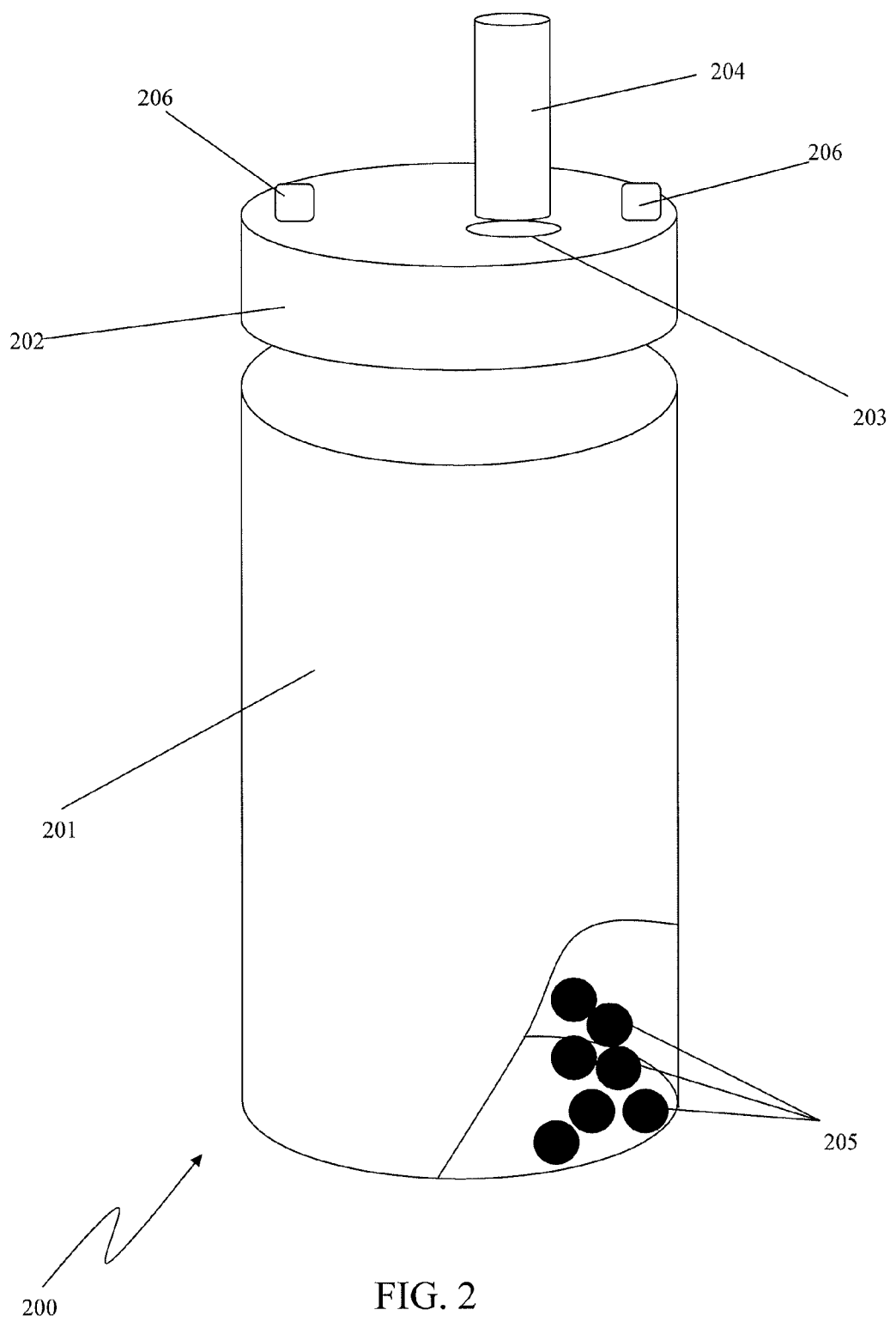

In order that this invention may be more readily understood and put into practical effect, reference will now be made to the accompanying drawings, which illustrate preferred embodiments of the invention, and wherein:

FIG. 1 is a schematic diagram depicting a power generation system according to one embodiment of the present invention; and FIG. 2 is a schematic diagram depicting one possible construction of a reactor core for use in a power generation system.

DESCRIPTION OF EMBODIMENTS OF THE INVENTION

With reference to FIG. 1 there is illustrated one arrangement of power generation system 100 according to one embodiment of the present invention. As shown the system is a hybrid geothermal system and includes a geothermal system including power plant 101 and pumping station 102 and a nuclear plant 103.

The geothermal system in this instance operates in a similar manner to that of most standard enhanced geothermal systems. More specifically the pumping station 102 is used to inject fluid from reservoir 104 through an injection well 105 into the bedrock 106 (also referred to as the hot dry rock HDR zone). The injection well usually ranges in depth to from 4000 m to 5000 m. Under most enhanced geothermal systems, however, the fluid injected into the crystalline bedrock 106 is extracted via a secondary bore (extraction well) usually coupled to the power plant 101. In the present example however the injection well is linked to the extraction well 107.

The advantage of the construction is that it obviates the need for hydraulic fracturing as occurs in the case of most enhanced geothermal systems which can lead to seismic events. As shown the fluid (e.g. water) is pumped into the top of the injection well at a relatively low pressure e.g. approx 30 psi to the base of the shaft which is at a distance of around 5000 m. At this depth the water pressure and temperature radically increase e.g. the water pressure may be around 6000 psi and at a temperature of approximately 500° C.

The continuous injection of fluid and the pressure exerted on the water force it up the extraction well 107. As the fluid rises up though the extraction well 107 both the temperature and pressure drops, in this case the water drops to a pressure of approximately 3500 psi around 3000 m and temperature of 450° C. at this point the water beings to enter its gaseous state (i.e. beings turning to steam). The water is ejected from the extraction well as high pressure (approx 3000 psi) steam which is then used to drive the turbines of the power plant 101 to produce electricity. While the geothermal system has been describe as utilising a single injection and extraction shaft, it will of course be appreciated by those of skill in the art that additional shafts may also be utilised to increase the generation capacity of the plant.

As noted above one of the problems associated with geothermal systems is their efficiency. The overall efficiency of the system degrades as heat is extracted from the HDR zone. To combat this drop in temperature the present invention utilises nuclear plant 103. Unlike a conventional nuclear plant the reactor/reactors of the plant 103 are constructed within a series of bores $108_1$, $108_2$, and $108_3$. More specifically the fissionable components $109_1$, $109_2$, $109_3$ of the reactor are positioned within the HDR zone. It will of course be appreciated by those of skill in the art that while the present example utilises just three reactor shafts that more shafts may be utilised depending on the size of the plant and the desire electricity output.

Instead of the heat generated by the fission of the reactor rods being utilised to directly heat water to steam for power generation the reactors are used to heat the surrounding bedrock 106. The increase in temperature of the bedrock can improve the overall efficiency of the of the geothermal system as the extracted steam remains at a higher temperature for longer enabling greater utilisation of the jet before to much energy is dissipated. Additionally given the reactors are required to heat the bedrock directly they can be run at a higher temperature than would normally be the case in a normal reactor. This is due mainly to the thermal mass of the rock that the reactors must heat i.e. the rock required a greater amount of energy input to produce a rise in temperature of a few degrees.

One advantage to this construction is that it can effectively increase the lifespan of a geothermal plant i.e. temperature drop is counter acted by injection of heat from the nuclear plant. In addition the risks associated with the reactor are minimised. As the core fissionable material is positioned within a strata of the Earth's crust where the materials are already radioactive the risk of radioactive contamination is minimal. Moreover given the depth of the reactor were it to go into melt down the resultant blast would have minimal impact as it is contained deep underground.

In the case of meltdown the system may be fitted with further safeguards. For instance each of the bores containing the reactors could have a series of explosive charges placed at discrete points along their length. In the event of a meltdown or other such failure the explosive could be set off to collapse the relevant bore over the reactor. In addition a part of the bore could then be filled with a shielding a material i.e. a suitable layer of concrete or other suitable material such as synroc etc. Additional when the fuel rods are spent there is no need to remove them from the shaft, the shaft can be simply sealed to contain the waste in a layer of the Earth's crust which is already radioactive.

As can be seen form the above discussion it is possible to utilise standard construction namely a series of fuel and control rods with a moderator medium disposed there between to improve the efficiency of geothermal power generation system by dissipating the heat generated from the reactor to the surrounding bedrock. Given the distance between the reactor core and the control controls it can be somewhat difficult to maintain control over the reaction to ensure efficient fuel usage (i.e. ensure prolonged operation of the reactor before sealing of the reactor core is required). Consequently the applicant has considered a number of alternate reactor designs to improve fuel usage and heat transference. More specially the applicant has consider the use of Very High Temperature Reactors (VHTR)

One type of VHTR design which is considered to be suitable for use in the present invention is that of a pebble bed reactor. This type of reactor is claimed to be passively safe that is, it removes the need for redundant, active safety systems. As these reactors are designed to handle high temperatures, they can cool by natural circulation and still survive in accident scenarios, which may raise the temperature of the reactor to 1,600° C. In addition the design of such reactors allow for higher thermal efficiencies than that of more traditional reactors.

Typically most pebble bed reactors include a core containing a plurality of spherical fuel elements (pebbles). The pebbles are made of pyrolytic graphite (which acts as the moderator), and they contain thousands of micro fuel particles called TRISO particles. These TRISO fuel particles consist of a fissile material uranium, thorium or plutonium surrounded by a coated ceramic layer of silicon carbide for structural integrity and fission product containment. In standard pebble reactors the core is encased in a concrete housing into which a cooling gas is then circulated. In addition the spent fuel is typically drawn away from the base of the core with new fuel injected into the top of the core. In the present case the removal of spent fuel is not possible nor is the circulation of a cooling gas necessary as the heat from the reactor is utilized to raise the temperature of the surrounding bedrock. Consequently the design of the pebble bed reactor for the present system has required some modification.

One possible construction of the pebble reactor core 200 for use in the enhanced geothermal power generation system of the present invention is shown in FIG. 2. As shown the core includes a housing 201, the housing in this example is constructed from synroc or other suitable material. The housing is in this instance is generally cylindrical and sized to fit within the bore 108 housing the reactor. The base of the housing 201 is sealed, the upper end of the housing is open to permit the insertion of the pebbles 205 to fuel the reactor. In the depicted example the upper end of the housing is sealed via the use of a closure 202 to seal the core.

The closure in this instance includes an aperture 203 for connection of an umbilical 204. In addition to the aperture 203 the closure also includes lugs for the attachment of tethers to permit the positioning of the reactor core 200 to the appropriate depth within the bore 108. The umbilical in this instance is utilised to carry a number of services including sensor equipment to monitor the reactor's operation e.g. temperature, radiation levels etc. The umbilical may also carry cooling lines to maintain the operation of the reactor at optimum levels for fuel consumption and heat transfer. It will of course be appreciated by those of skill in the art that the umbilical 204 would be formed from an appropriate heat resistant material capable of tolerating temperatures in excess of 500° C. and which has sufficient tensile strength to resist shearing forces etc. which it may be exposed to within the bore.

It will be appreciated by those of skill in the art that while a coolant may be introduced into the reactor core to optimise operating life of the reactor core it is not strictly necessary. In the present case the reactor core is able to run at higher temperatures for a prolonged period given the large thermal mass it is required to heat.

While the above discussion of the reactor core contemplates filling the reactor with the fissionable materials prior to insertion into the bore, the potential for exposure and possible meltdown are somewhat increased. Accordingly the reactor core 200 could be lowered a safe distance into the bore 108 before the fuel is added via the umbilical or other such filing tube.

It will also be appreciated by those of skill in the art that as there is no need to remove the core form the bore once it is positioned at the required depth. Once the fuel is depleted the bore 108 can be sealed and a new bore drilled for receipt of a new core. Consequently no radioactive debris is brought back to the surface with all waste being contained with the hot dry rock zone which in its self is inherently radioactive.

In other embodiments of the invention the reactors could also be utilised to generate electricity in a conventional manner to supplement the electricity generated from the geothermal plant. In such instances the closure or the reactor may be fitted with heat exchanger which when the closure is fitted would be retained within the reactor core the tail ends of the exchange could then be coupled to a fluid inlet and outlet lines.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

The invention claimed is:

1. A system for power generation the system including:
    a geothermal system including a power plant, at least one injection shaft extending a predetermined depth to enable injection of fluid to a hot dry rock (HDR) zone and at least one extraction shaft extending a predetermined depth to enable extraction of fluid from the HDR zone to be used by the power plant to generate power; and
    a nuclear system including a nuclear plant and at least one reactor, the reactor being positioned remote from the nuclear plant, wherein the at least one reactor is positioned within a region of the HDR zone between the injection and extraction shafts to heat rock in the region of the HDR zone.

2. The power generation system of claim 1 wherein the geothermal system includes a pumping station.

3. The power generation system of claim 1 wherein the injection shaft and extraction shaft are drilled to a depth between 4400 m and 5000 m.

4. The power generation system claim 2 wherein the injection shaft and extraction shaft are connected.

5. The power generation system claim 4 wherein the injection shaft and extraction shaft are connected to form a substantially U shaped conduit between the power plant and the pumping station.

6. The power generation system of claim 1 wherein the fluid is pumped into the top of the injection shaft at a low pressure.

7. The power generation system of claim 6 wherein the fluid is fed by the pumping station into the injection shaft at a pressure between 30-40 psi.

8. The power generation system of claim 1 wherein the fluid is extracted from the extraction shaft as a high pressure vapour stream.

9. The power generation system of claim 8 wherein the pressure on the fluid along the length of the extraction shaft varies in pressure between 3000 to 6000 psi.

10. The power generation system of claim 8 wherein the high pressure vapour stream is utilised to drive one or more turbines housed within the power plant.

11. The power generation system of claim 10 wherein the power plant further includes one or more condensers for condensing the vapour stream back into a fluid for re-injection back into the injection shaft.

12. The power generation system of claim 1 wherein the geothermal system includes additional injection and extraction shafts positioned between the power plant and pumping station.

13. The power generation system of claim 1 wherein the nuclear reactor is positioned within a shaft at a depth of 3000 m to 4400 m.

14. The power generation system of claim 13 wherein the rector is powered via a set of uranium rods.

15. The power generation system of claim 13 wherein the shaft housing the reactor includes a series of explosive charges placed at discrete points along its length, wherein triggering of the explosive charges seals the shaft.

16. The power generation system of claim 1 wherein the nuclear system includes a plurality of reactors positioned with the region between the injection and extraction shafts.

17. The power generation system of claim 16 wherein each reactor within the plurality of reactors is a pebble bed reactor.

18. The power generation system of claim 17 wherein each of the reactors includes a reactor core coupled to the nuclear plant via an umbilical, and wherein at least one sensor is coupled to the reactor core via the umbilical.

19. The power generation system of claim 17 wherein the umbilical provides for the passage of a coolant to the reactor core.

20. A method for producing power said method including the steps of:
    drilling an injection shaft to a predetermined depth to enable injection of fluid to a hot dry rock (HDR) zone;
    drilling an extraction shaft to a predetermined depth to enable extraction of fluid from the HDR zone to be used by a power plant to generate power;
    positioning a reactor core in a region of the HDR zone between the injection and extraction shaft to heat rock in the region of the HDR zone;
    pumping fluid into the injection shaft under low pressure;
    extracting vapour under high pressure from the extraction shaft;
    maintaining, utilising the reactor core, a substantially constant temperature differential within the region of the HDR zone between the injection and extraction shafts to promote the conversion of the fluid to a high pressure vapour stream, and
    generating power by a power plant using the vapour extracted from the extraction shaft.

* * * * *